United States Patent [19]
Kashiwase

[11] Patent Number: 6,042,498
[45] Date of Patent: Mar. 28, 2000

[54] AUTOMATIC TRANSMISSION

[75] Inventor: Hajime Kashiwase, Tokyo, Japan

[73] Assignee: Fuji Jukogyo Kabushiki Kaisha, Tokyo, Japan

[21] Appl. No.: 09/176,663

[22] Filed: Oct. 21, 1998

[30] Foreign Application Priority Data

Oct. 23, 1997 [JP] Japan .................................. 9-291312

[51] Int. Cl.$^7$ .............................................. B60K 17/00
[52] U.S. Cl. ....................... 475/210; 475/211; 475/212; 475/159; 474/18
[58] Field of Search .................................. 475/210–216, 475/159; 474/18, 28

[56] References Cited

U.S. PATENT DOCUMENTS

| | | | |
|---|---|---|---|
| 5,112,280 | 5/1992 | Sato | 474/18 |
| 5,183,439 | 2/1993 | Yumoto et al. | 474/28 X |
| 5,607,371 | 3/1997 | Yamaguchi | 475/210 |
| 5,628,700 | 5/1997 | Yamada et al. | 474/28 X |
| 5,800,298 | 9/1998 | Kanehara et al. | 474/17 X |
| 5,803,857 | 9/1998 | Yamamoto | 475/216 X |
| 5,888,168 | 3/1999 | Niiyama et al. | 474/28 X |

FOREIGN PATENT DOCUMENTS

| | | |
|---|---|---|
| 3219121 | 9/1991 | Japan . |
| 4165149 | 6/1992 | Japan . |

*Primary Examiner*—Khoi Q. Ta
*Attorney, Agent, or Firm*—Martin A. Farber

[57] ABSTRACT

An automatic transmission including a continuously variable transmission, a friction type starting apparatus and a forward and reverse changeover apparatus, comprises a sealed clutch housing rotating integrally with an engine output shaft for accommodating the friction type starting clutch and the forward and reverse changeover apparatus therein, a lubricating oil filled up in the clutch housing for cooling the starting clutch and the forward and reverse changeover apparatus and a clutch drum of the starting clutch integrally formed with the clutch housing, thereby an abrupt temperature rise in the starting clutch can be prevented and the durability of the starting clutch can be substantially improved. Further, since the friction type starting clutch and the forward and reverse changeover apparatus are packaged in the sealed clutch housing, a compact automatic transmission can be realized.

4 Claims, 5 Drawing Sheets

AUTOMATIC TRANSMISSION

BACKGROUND OF THE INVENTION

1. Field of the Invention

The present invention relates to an automatic transmission for an automobile and more particularly to an automatic transmission whose friction type starting clutch and forward and reverse changeover apparatus are packaged in a sealed clutch housing.

2. Prior Art

Generally, an automatic transmission having a continuously variable transmission comprises a starting apparatus for controlling a power transmission from an engine to a transmission on starting, a forward and reverse changeover apparatus for reversing the rotational direction of a drive shaft in order to propel a vehicle in the reverse direction and a clutch section for changing over driving force supplied to the forward and reverse changeover apparatus.

FIG. 3 shows a skeleton of an example of an automatic transmission 1 in which a starting apparatus and a forward and reverse changeover apparatus are arranged on the input side of the continuously variable transmission. A driving force of an engine 25 is transmitted to a planetary carrier 4b supporting a double planetary pinion 4a of a planetary gear 4 through a damper unit 2 secured to an output shaft 26 of the engine 25.

At starting forward, a reverse brake plate 5 which is connected with a ring gear 4c of the planetary gear 4 is released and a forward clutch plate 6 which is connected with the planetary carrier 4b is gradually engaged by hydraulic pressure supplied to a clutch operating chamber 6a. In this example, the forward clutch plate 6 also has a function as a starting clutch. When the forward clutch plate 6 is fully engaged, the driving force of the engine 25 is transmitted to a primary pulley 7a through a plunger 7g connected with the primary pulley 7a, whereby the primary pulley 7a is rotated in the right direction.

At reverse running, the forward clutch plate 6 is released and the reverse brake plate 5 is gradually engaged by hydraulic pressure supplied to a brake operating chamber 5a. In this example, the reverse brake plate 5 is employed also for a starting clutch. When the reverse brake plate 5 is fully engaged, the ring gear 4c is fixed and the planetary pinion 4a rotates a sun gear 4d as provided on an input shaft 7c formed integrally with the primary pulley 7b at a specified reduction speed in the reverse direction. In this drawing, numeral 8 denotes a flywheel and numeral 9 denotes an oil pump.

Further, FIG. 4 shows another example of an automatic transmission 1 in which a continuously variable transmission 7 is arranged on the input side of the forward and reverse changeover apparatus and a friction type starting clutch is arranged on the output side thereof. A driving force of the engine 25 is inputted to a planetary input shaft 10 through the damper unit 2 secured to the output shaft 26 of the engine 25. The planetary input shaft 10 is connected with a clutch hub 4e and the sun gear 4d of the planetary gear 4.

At starting forward, the reverse brake plate 5 provided on the outer periphery of the ring gear 4c is released and on the other hand the forward clutch plate 6 connected with the planetary carrier 4b is engaged. The driving force inputted to the planetary input shaft 10 is transmitted to the input shaft 7c formed integrally with the primary shaft 7b secured to the primary pulley 7a of the continuously variable transmission 7, thereby the primary pulley 7a is rotated in the right direction.

Further, at reverse running, the forward clutch plate 6 is released and the reverse brake plate 5 is engaged. When the reverse brake plate 5 is engaged, the ring gear 4c is fixed and the driving force inputted to the planetary input shaft 10 is transmitted to the input shaft 7c through the sun gear 4d, the planetary pinion 4a and the planetary carrier 4b supporting this planetary pinion 4a, thereby the input shaft 7c is rotated at a reduced speed in the reverse direction.

At starting forward or in the reverse direction, when the driving force is transmitted to the primary pulley 7a, a secondary pulley 7e interconnected with the primary pulley 7a through a belt 7d rotates. At starting, a friction type starting clutch 11 connected with an output shaft 7f of the secondary pulley 7e is gradually engaged and the driving force is transmitted to drive shafts 14 interconnected with front or rear wheels through the friction type starting clutch 11, a final reduction gear unit 12 and a differential gear 13. The oil pump 9 is driven by the planetary input shaft 10 through a chain 15.

For example, Japanese Patent Application Laid-open No. Toku-Kai-Hei 4-165149 discloses a technique in which the friction type starting clutch 11 is disposed on the output side of the secondary pulley 7e of the continuously variable transmission.

FIG. 5 shows a case where the engine 25 and the automatic transmission 1 are arranged transversely, in which an overall width $W_S$ of the combination of the engine 25 and the automatic transmission 1 must be of a size capable of accommodating the combination in an engine room 21a.

Recent motor vehicles have a frame 22 on both sides of the engine room 21a respectively in order to absorb an impact in case the vehicle has a collision. Furthermore, a front tire 23 is arranged outside of the frame 22, respectively.

The frame 22 must have a certain amount of sectional area sufficient to have rigidity for securing a safety on impact and also the front tire 23 is required to move within as large steering angle as possible in order to obtain a small turning circle radius. Further, recent motor vehicles have a tendency to reduce the width of the vehicle body due to a necessity of improving fuel economy.

As a result of this, a space for accommodating the engine 25 and the transmission 1 in the engine room 21a tends to decrease, therefore the overall width $W_s$ of the combination of the engine and transmission is required to be shortened as far as possible. One idea for realizing this is to reduce a widthwise size $W_T$ of the automatic transmission 1 itself.

That is, in order to reduce the size $W_T$ in the axial direction of the automatic transmission 1 arranged in this manner, several means such as decreasing the pulley ratio of the continuously variable transmission, decreasing the spline-fitting width of the planetary input shaft 10, reducing the wall thickness of components, closing clearances between components or the like can be considered. However, any of these means may adversely affect the function of the automatic transmission 1 or may reduce the rigidity and strength of the automatic transmission 1.

On the other hand, since the speed reduction ratio of the continuously variable transmission varies continuously, it is connected with the engine directly. Generally, in case of a multi-stage automatic transmission, it is necessary to generate a slip leading to a power loss in the clutch in order to alleviate a shift shock. The continuously variable transmission is free from such a power loss. Further, in the continuously variable transmission, since it is possible to maintain the speed reduction ratio in an optimum state in the relationship between vehicle and engine speeds, a driving efficiency is largely improved and as a result fuel economy and running performance can be enhanced.

In general, it is necessary to enlarge a controllable range of the speed reduction ratio in order to raise a driving efficiency. Further, inherently, the starting apparatus acts as shutting off the power transmission between the engine and the transmission when the engine revolution can be maintained no more due to an excessive drop of the engine speed in such cases as stopping or starting or when the direction of power transmission changes in such a case as changing-over from forward to reverse or vice versa. Therefore, since the starting apparatus may be adequate if this shutting-off function is satisfied on starting, stopping or changing-over the running direction, there is a leeway to reduce the size of the starting apparatus itself.

However, on the other hand, there is a case where the driving force must be transmitted with the starting apparatus kept in a slip state when a large driving force is needed in such a case as starting in creep. The starting apparatus held in this state generates a large amount of heat and this results in a seizure in the clutch facing. The seizure incurs not only a reduced performance of power transmission but also a short life of the starting apparatus.

With respect to the automatic transmission shown in FIG. 3, the forward clutch plate 6 and the reverse brake plate 5 are both used also for a starting apparatus but these clutch and brake plates should be used inherently for clutching or braking, respectively, not for a starting apparatus capable of withstanding heavy duty. Accordingly, these components are lacking in heat capacity endurable in heat generation at consecutive stall startings.

Further, with respect to the automatic transmission shown in FIG. 4, since the friction type starting clutch 11 is disposed on the output side of the secondary pulley 7e which is subjected to a larger torque than the input side of the primary pulley 7a, some means for increasing a heat capacity are required.

As an example of a technique having a heat countermeasure, there is Japanese Patent Application Laid-open No. Toku-Kai-Hei 3-219121, in which the clutch plate of the friction type starting clutch is accommodated in a clutch cover wherein oil is circulated to cool the clutch facing. According to this prior art, however, the clutch cover needs a certain amount of volume for accommodating the clutch plate therein and as a result this elongates an axial length of the automatic transmission.

SUMMARY OF THE INVENTION

In view of these problems of the prior arts, it is an object of the present invention to realize a compact automatic transmission using a friction type starting clutch without degrading durability and function. Also it is anther object of the present invention to provide an automatic transmission capable of reducing the axial size of the transmission so as to be able to be mounted transversely in an engine room together with an engine.

In order to attain these objects, the automatic transmission comprises a continuously variable transmission, a friction type starting clutch, a forward and reverse changeover apparatus, a sealed clutch housing rotating integrally with an engine output shaft for accommodating the friction type starting clutch and the forward and reverse changeover apparatus therein, a lubricating oil filled up in the clutch housing for cooling the starting clutch and the forward and reverse changeover apparatus and a clutch drum of the starting clutch integrally formed with the clutch housing.

DESCRIPTION OF THE DRAWINGS

By way of example only, embodiments of the present invention will now be described, with reference to the accompanying drawings, in which.

DETAILED DESCRIPTION OF THE INVENTION

Figure 1:
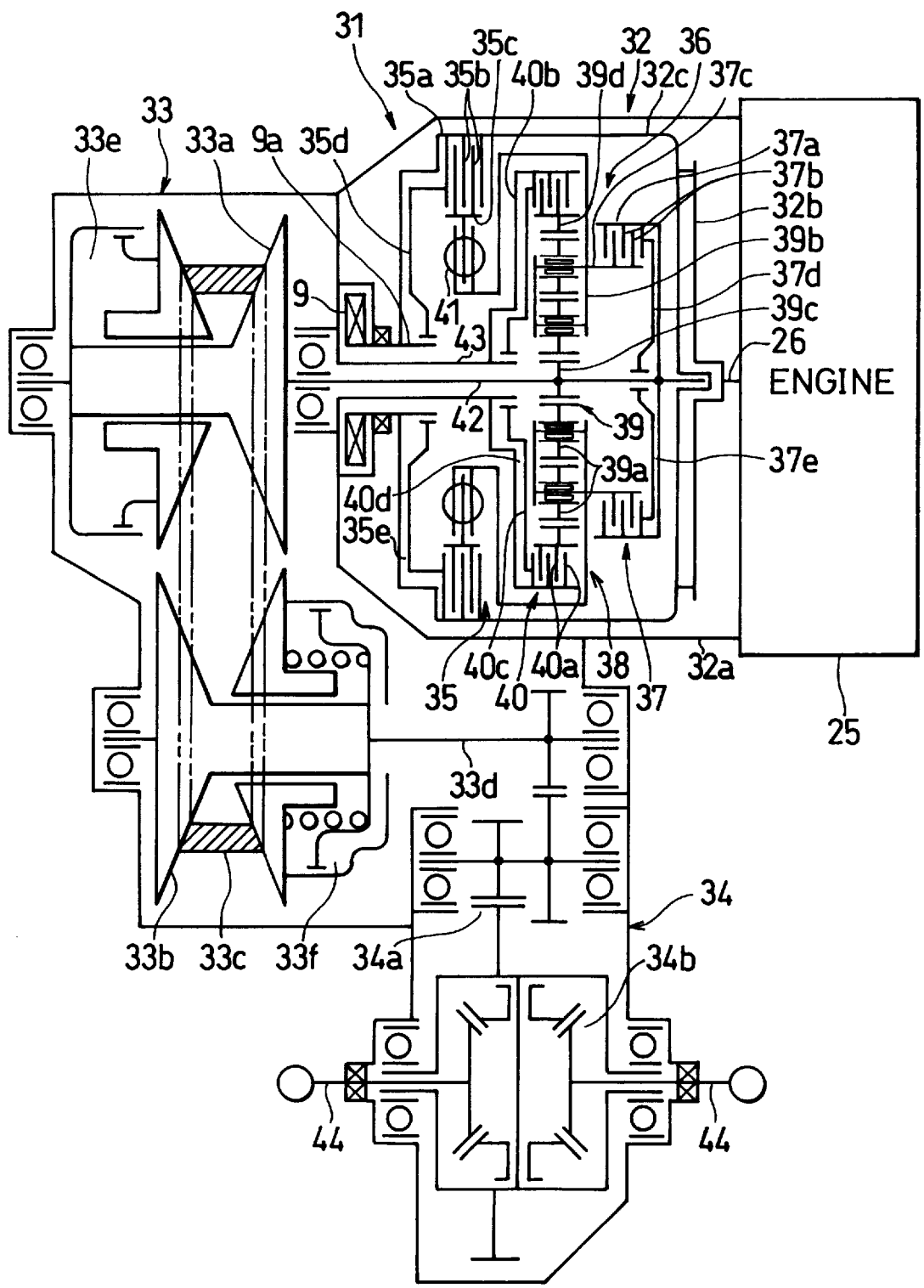
FIG. 1 is a schematic view showing an automatic transmission according to a first embodiment of the present invention.

Referring now to FIG. 1, numeral 31 denotes an automatic transmission comprising a starting clutch unit 32, a continuously variable transmission 33 and a final reduction gear unit 34. A case 32a for accommodating the starting clutch unit 32 is secured to an engine 25. An output shaft 26 of the engine 25 is connected with a drive plate 32b which is housed in the case 32a.

The drive plate 32b is secured to a clutch housing 32c extending towards the continuously variable transmission 33. The clutch housing 32c forms a sealed shell and is connected on the opposite side thereof with respect to the engine 25 with an oil pump drive shaft 9a extending to an oil pump 9 and the oil pump drive shaft 9a is rotatably supported by a fixed shaft 43. Further, a friction type starting clutch 35 is disposed on the oil pump 9 side and a forward and reverse changeover apparatus 36 is arranged between the friction type starting clutch 35 and the engine 25. That is, the clutch housing 32c encloses the friction type starting clutch 35 and the forward and reverse changeover apparatus 36 in the sealed shell which rotates integrally with the output shaft 26 of the engine 25.

The forward and reverse changeover apparatus 36 comprises a forward clutch 37 and a reversing device 38 and further this reversing device 38 comprises a planetary gear 39 and a reverse brake 40. The forward clutch 37 is disposed on the engine 25 side and there is provided with the planetary gear 39 between the forward clutch 37 and the friction type starting clutch 35. Further, there is provided with the reverse brake 40 around the outer periphery of the planetary gear 39.

Further, a clutch drum 35a of the friction type starting clutch 35 is integrally formed with the clutch housing 32c and a clutch hub 35c is provided with multiple disc clutch plates 35b between. Further, a clutch piston 35d for operating the multiple disc clutch plates 35b is mounted slidably in the axial direction on the oil pump drive shaft 9a and a clutch operating chamber 35e is formed between the clutch piston 35d and the inner surface of the clutch housing 32c.

The planetary gear 39 is composed of a plurality of double planetary pinions 39a which are supported on both sides thereof by a planetary carrier 39b, respectively. The planetary carrier 39b on the forward clutch 37 side extends towards the friction type starting clutch 35 over the outer periphery of the reverse brake 40 and is connected with the clutch hub 35c through a damper unit 41.

Further, a sun gear 39c of the planetary gear 39 is integrally formed with a pulley input shaft 42 extending from a primary pulley 33a of a primary pulley 33a of the continuously variable transmission 33. The double planetary pinions 39a arranged around the sun gear 39c mesh with a ring gear 39d which is provided around the double planetary pinions 39a and a brake drum 40b is provided face to face with the outer periphery of the ring gear 39d via brake plates 40a. This brake drum 40b is connected with the aforesaid fixed shaft 43 which rotatably supports the oil pump drive shaft 9a. Further, a brake piston 40c for operating the brake plates 40a is interposed between the brake drum 40b and the planetary gear 39 and is mounted slidably in the axial direction on the fixed shaft 43. Also, a brake operating chamber 40d is formed between the brake piston 40c and the brake drum 40b.

A forward clutch drum 37a of the forward clutch 37 is secured to the pulley input shaft 42 and a forward clutch hub 37c is provided face to face with the forward clutch drum 37a through forward clutch plates 37b and is interconnected with the planetary carrier 39b which is connected with the clutch hub 35c of the friction type starting clutch 35. Further, a forward clutch piston 37d for operating the forward clutch plates 37b is supported slidably in the axial direction by the forward clutch drum 37a and a forward clutch operating chamber 37e is formed between the forward clutch piston 37d and the forward clutch drum 37a.

The clutch housing 32c is filled up with a lubricating oil and the oil pump 9 circulates the lubricating oil within the clutch housing 32c through a lubricating oil circuit (not shown). The components which constitute the friction type starting clutch 35 and the forward and reverse changeover apparatus 36 are lubricated and also cooled by this lubricating oil.

Further, the primary pulley 33a of the continuously variable transmission 33 is interconnected with a secondary pulley 33b through a belt 33c. A pulley output shaft 33d secured to the secondary pulley 33b is connected with a differential gear 34b through a reduction gear train 34a of a final reduction gear unit 34 and the differential gear 34b is connected with a drive axle 44 of front or rear wheels.

The groove width of the primary pulley 33a of the continuously variable transmission 33 is determined by a primary oil pressure supplied to a primary oil pressure chamber 33e. Further, a tension required for torque transmission of the belt 33c is given by the secondary pulley 33b through a secondary oil pressure supplied to a secondary oil pressure chamber 33f. The primary oil pressure and the secondary oil pressure are established based on the engine operating conditions, respectively. The groove width of both pulleys 33a, 33b which are inversely proportional with each other determines a desired speed reduction ratio.

Next, an operation of thus constituted automatic transmission will be described.

When the engine 25 starts up, the oil pump 9 is driven by the engine 25 through the drive plate 32b and the clutch housing 32c to supply the lubricating oil towards downstream of a hydraulic control circuit (not shown). A part of the lubricating oil is supplied to the inside of the clutch housing 32c for lubrication and cooling thereof. After lubricating and cooling components in the clutch housing 32c, the lubricating oil is drained from the clutch housing 32c.

When the select lever is positioned at "P" or "N" range, the friction type starting clutch 35 is released and a power transmission to the forward and reverse changeover apparatus 36 is shut off.

When the select lever is positioned at "D" or other forward running range, a hydraulic pressure is supplied to the forward clutch operating chamber 37e of the forward clutch 37 constituting the forward and reverse changeover apparatus 36 to engage the forward clutch plate 37b through the forward clutch piston 37d. At this moment, the reverse brake plate 40a of the reverse brake 40 is disengaged.

After that, when a vehicle driver depresses an accelerator pedal, a hydraulic pressure is supplied to the clutch operating chamber 35e of the friction type starting clutch 35 to push the multiple disc clutch plates 35b through the clutch piston 35d. As a result, the multiple disc clutch plates 35b transfer from a partial engagement state to a full engagement state according to the degree of the depression of the accelerator pedal. When the vehicle is in standstill, the hydraulic pressure supplied to the clutch operating chamber 35e is reduced based on signals from an accelerator pedal switch (not shown) and a vehicle speed sensor (not shown) to release the multiple disc clutch plates 35b for preventing the engine stall.

When the multiple disc clutch plates 35b are in a partial engagement state or fully engaged, the driving force is transmitted to the planetary carrier 39b of the forward and reverse changeover apparatus 36 through the clutch drum 35a, the multiple disc clutch plates 35b, the clutch hub 35c and the damper unit 41.

At this moment, since the forward clutch hub 37c which is connected with the planetary carrier 39b is interconnected with the forward clutch drum 37a disposed face to face with the forward clutch hub 37c through the forward clutch plates 37b, the driving force is transmitted to the pulley input shaft 42 which is connected with the forward clutch drum 37a to rotate the primary pulley 33a of the continuously variable transmission 33 in the right direction.

On the other hand, when the select lever is set to "R" range with an accelerator pedal released, the hydraulic pressure supplied to the forward clutch operating chamber 37e is reduced to release the forward clutch plates 37b and at the same time the hydraulic pressure is supplied to the brake operating chamber 40d of the reverse brake 40 to press the brake plates 40a through the brake piston 40c for engagement.

Then, the ring gear 39d of the planetary gear 39 is fixedly connected with the brake drum 40b secured to the fixed shaft 43.

After that, when the vehicle driver depresses the accelerator pedal (not shown) for reverse running, the multiple disc clutch plates 35b of the friction type starting clutch 35 are engaged gradually as the depression amount of the accelerator pedal increases and the driving force outputted from the engine 25 is transmitted to the planetary carrier 39b through the multiple disc clutch plates 35b. Then, the double planetary pinion 39a supported by the planetary carrier 39b is revolved around the sun gear 39c while the double planetary pinion 39a is rotated around the center axis thereof and as a result, because the ring gear 39d is fixed, the sun gear 39c secured to the pulley input shaft 42 is rotated in the reverse direction at a reduce speed.

When the vehicle starts up from a state of standstill, a large driving force is needed and so the engine revolution speed must be raised to some extent. Therefore, the multiple disc clutch plate 35b of the friction type starting clutch 35 comes into a partial engagement state and as a result it generates a large amount of frictional heat in the clutch facing thereof. According to the embodiment of the present invention, since the clutch housing is filled with lubricating oil circulating therein, the clutch facing of the multiple disc clutch pales 35*b* is cooled by the lubricating oil, whereby an abrupt temperature increase is prevented. Particularly, in this embodiment, since the oil pump 9 is directly driven by the engine 25, when the engine speed increases on starting, the amount of lubricating oil supplied to the clutch housing 32*c* also increases, thereby the cooling effect is further enhanced.

Further, since the forward and reverse changeover apparatus 36 is accommodated together in the clutch housing 32*c*, the components subjected to friction of the forward and reverse changeover apparatus 36 are cooled by the lubricating oil, these components are largely improved in durability. Further, since the friction type starting clutch 35 and the forward and reverse changeover apparatus 36 are accommodated adjacent to each other in the clutch housing 32*c*, the size of the starting clutch unit 32 can be reduced.

Further, since the friction type starting clutch 35 and the forward and reverse changeover apparatus 36 are arranged adjacent to each other, the clutch hub 35*c* can be connected through the planetary carrier 39*b* with the forward clutch hub 37*c*, thereby the number of components can be reduced and the construction can be further simplified.

Figure 2:
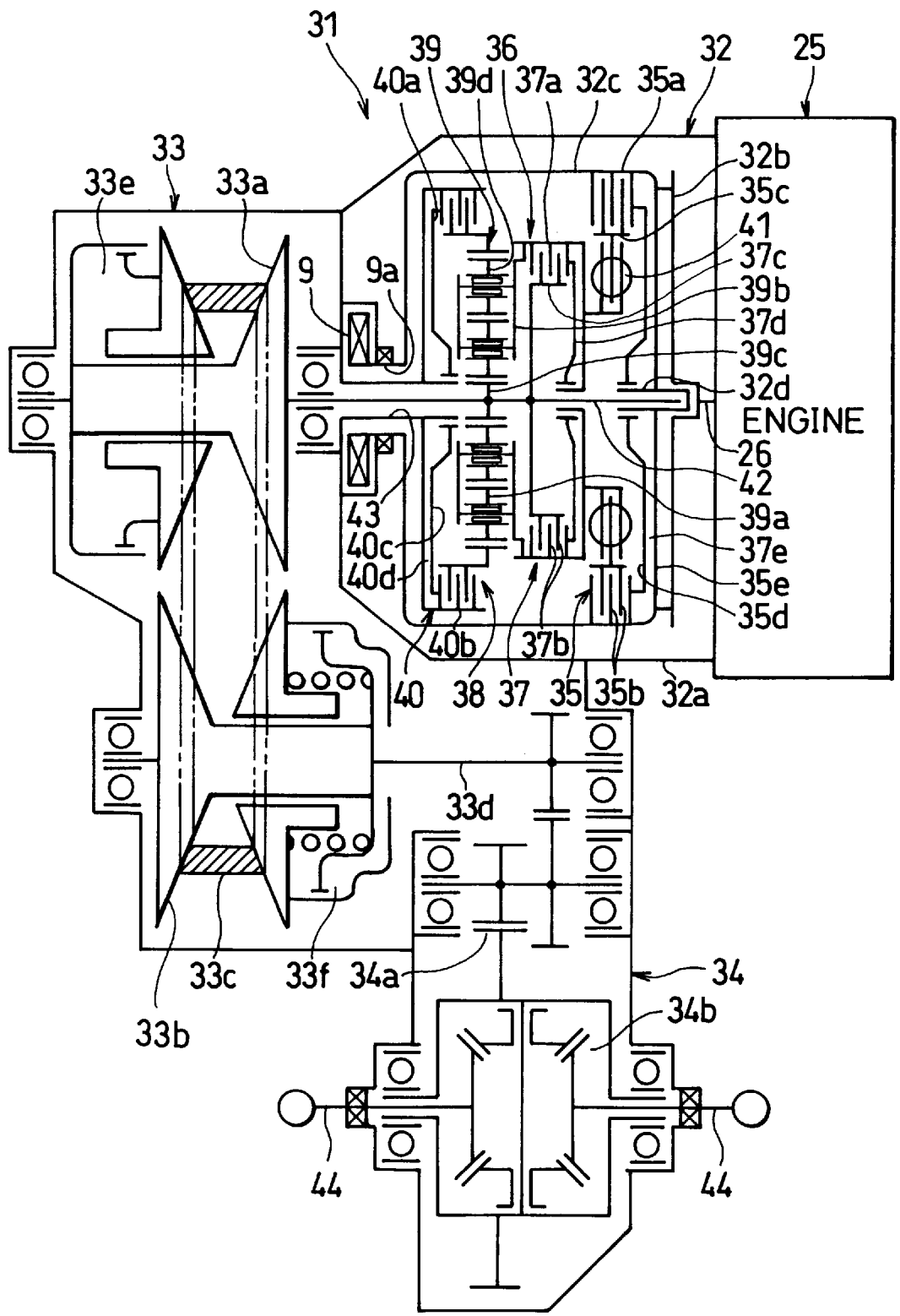
FIG. 2 is a schematic view showing an automatic transmission according to a second embodiment of the present invention.
Figure 3:
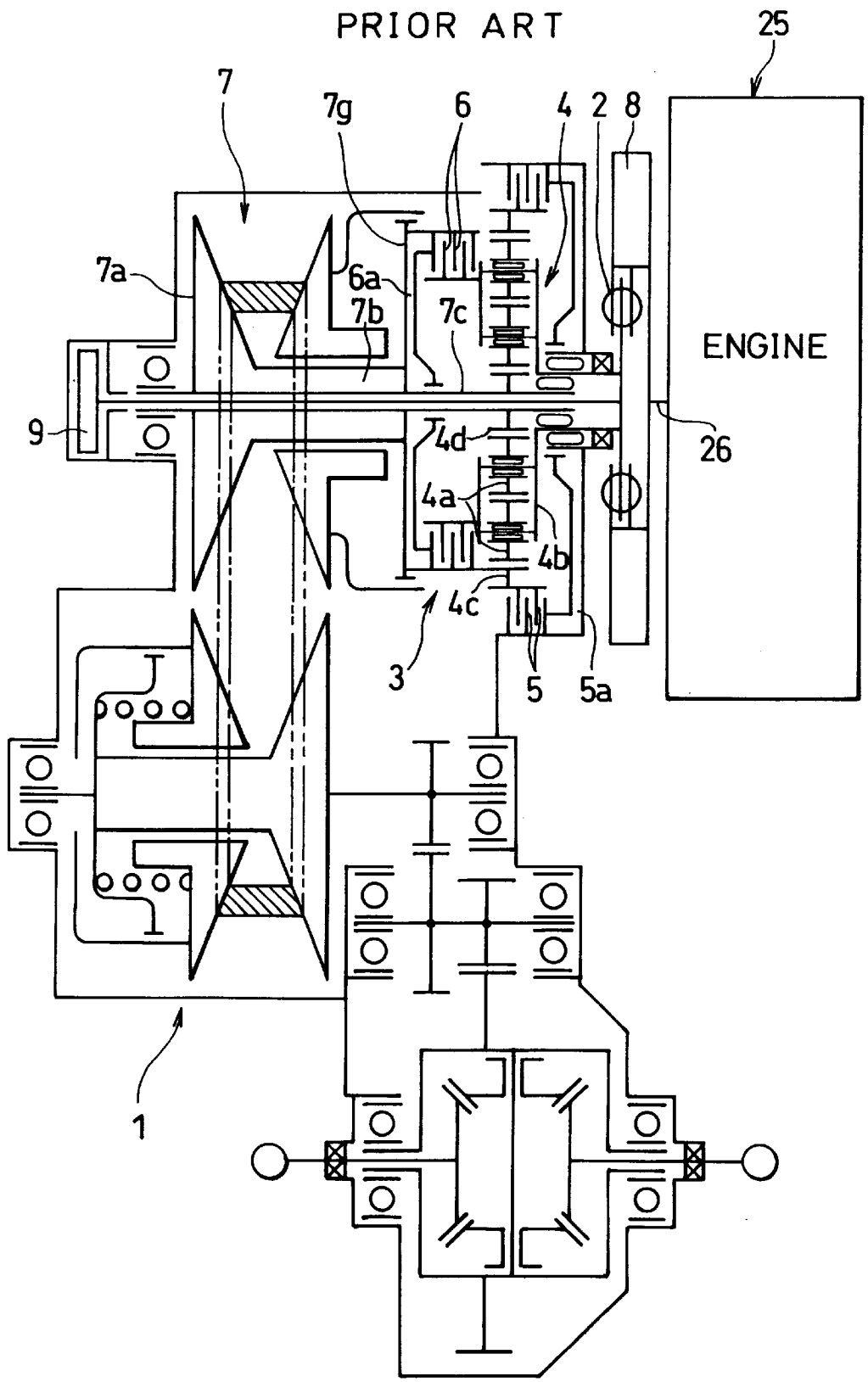
FIG. 3 is a schematic view showing an automatic transmission according to a prior art.
Figure 4:
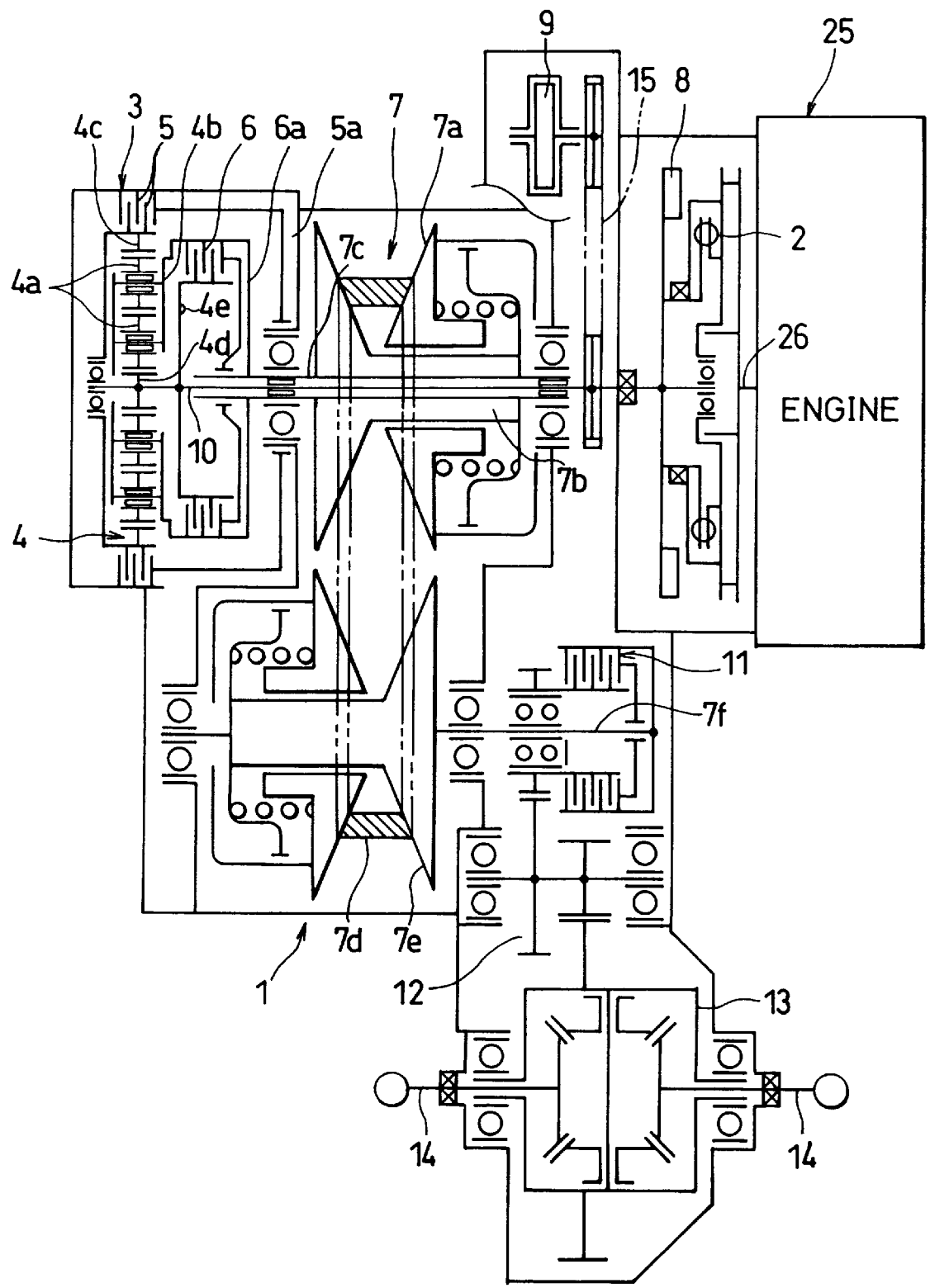
FIG. 4 is a schematic view showing another automatic transmission according to a prior art.
Figure 5:
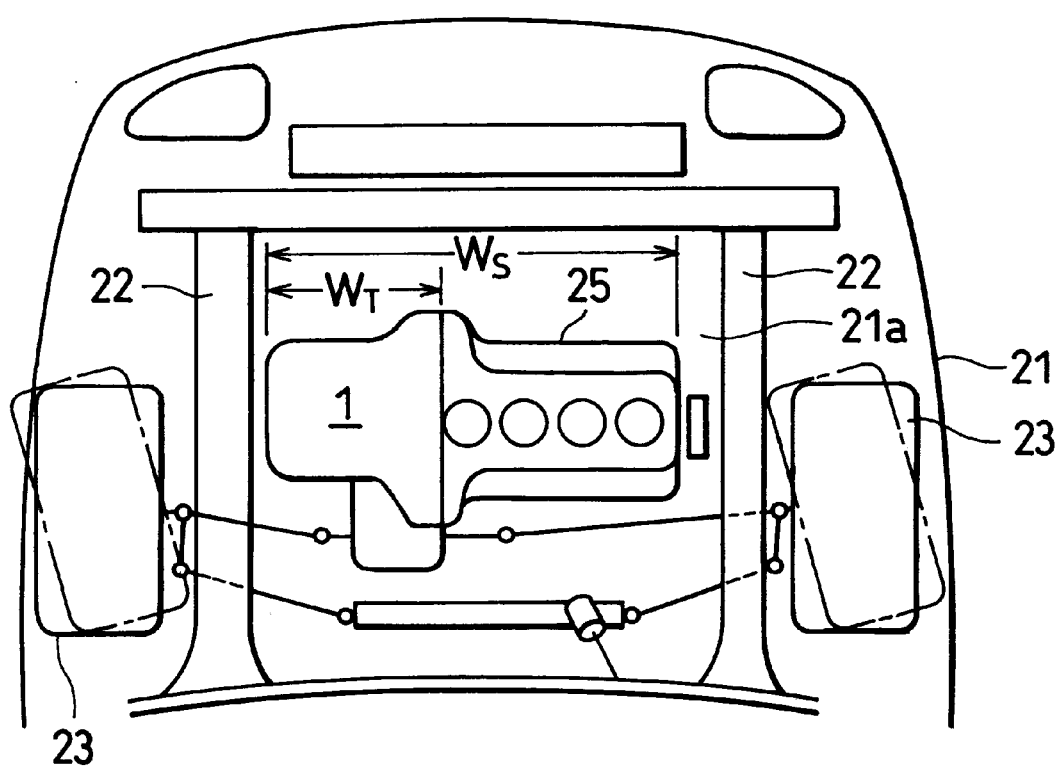
FIG. 5 is a schematic plane view showing a layout of an automatic transmission integrally coupled with an engine which is mounted transversely in an engine room.

FIG. 2 shows a second embodiment of the present invention. According to the second embodiment, the friction type starting clutch 35 is disposed on the engine 25 side and the forward and reverse changeover apparatus 36 is arranged on the oil pump 9 side. The clutch piston 35*d* of the friction type starting clutch 35 is supported slidably in the axial direction on the fixed shaft 32*d* which is directly fixed to the clutch housing 32*c*. Further, the forward clutch drum 37*a* of the forward clutch 37 is rotatably mounted on the pulley input shaft 42 and the forward clutch hub 37*c* is secured to the pulley input shaft 42.

Generally, since the multiple disc clutch plates 35*b* of the friction type starting clutch 35 are formed so as to have as a large diameter as possible in order to secure a large heat radiation area, their inner diameter portion has an inner diameter space, namely, a space formed between the inner periphery of the multiple disc clutch plates 35*b* and the pulley input shaft 42. Therefore, at least a part of the forward clutch plates 37*b* can be squeezed in that space in the axial direction, thereby the axial size of the clutch housing 32*c* can be reduced.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An automatic transmission having a continuously variable transmission, a friction type starting clutch for transmitting or shutting off a driving force of an engine output shaft to said transmission, and a forward and reverse changeover apparatus including a reversing device for reversing the rotational direction of said driving force, a forward clutch for shutting off said driving force when said reversing device is operated, and a reverse brake for controlling said reversing device, comprising:

a sealed clutch housing rotating integrally with said engine output shaft for accommodating said starting clutch and said forward and reverse changeover apparatus therein;

a lubricating oil filled up in said clutch housing for cooling said starting clutch and said forward and reverse changeover apparatus; and a clutch drum of said starting clutch integrally formed with said clutch housing.

2. The automatic transmission according to claim 1, wherein said starting clutch is disposed on the side of said transmission, said forward clutch is disposed on the side of said engine and said reversing device is interposed between said starting clutch and said forward clutch.

3. The automatic transmission according to claim 1, wherein said starting clutch is disposed on the side of said engine, said reversing device is disposed on the side of said transmission and said forward clutch is interposed between said starting clutch and said reversing device.

4. The automatic transmission according to claim 3, wherein at least a part of said forward clutch is accommodated in an inner diameter space formed around the center of said starting clutch.

* * * * *